US008798043B2

(12) United States Patent
Vadivelu

(10) Patent No.: US 8,798,043 B2
(45) Date of Patent: Aug. 5, 2014

(54) APPARATUS AND METHOD FOR ROUTING TRAFFIC IN MULTI-LINK SWITCH

(75) Inventor: Ramkumar Vadivelu, San Jose, CA (US)

(73) Assignee: Brocade Communications Systems, Inc., San Jose, CA (US)

(*) Notice: Subject to any disclaimer, the term of this patent is extended or adjusted under 35 U.S.C. 154(b) by 3118 days.

(21) Appl. No.: 10/610,371

(22) Filed: Jun. 30, 2003

(65) Prior Publication Data

US 2004/0071134 A1 Apr. 15, 2004

Related U.S. Application Data

(60) Provisional application No. 60/393,047, filed on Jun. 28, 2002.

(51) Int. Cl.
*H04L 12/50* (2006.01)

(52) U.S. Cl.
USPC .......................................... 370/373; 370/422

(58) Field of Classification Search
USPC ..................... 370/373, 351, 386, 422, 395.1
See application file for complete search history.

(56) References Cited

U.S. PATENT DOCUMENTS

| 5,835,482 | A | | 11/1998 | Allen ............................ 370/225 |
| 5,838,681 | A | * | 11/1998 | Bonomi et al. ........... 370/395.41 |
| 5,872,930 | A | | 2/1999 | Masters et al. ................ 395/200 |
| 5,930,254 | A | * | 7/1999 | Liron et al. ................ 370/238.1 |
| 6,055,228 | A | | 4/2000 | DeKoning et al. ............ 370/259 |
| 6,072,797 | A | | 6/2000 | Fletcher ........................ 370/394 |
| 6,101,190 | A | * | 8/2000 | Song ............................. 370/411 |
| 6,400,681 | B1 | | 6/2002 | Bertin et al. .................. 370/218 |
| 6,781,956 | B1 | * | 8/2004 | Cheung ..................... 370/235.1 |
| 6,829,215 | B2 | | 12/2004 | Tornar ......................... 370/223 |
| 6,847,674 | B1 | | 1/2005 | Wrenn ..................... 370/395.32 |
| 6,898,189 | B1 | | 5/2005 | Di Benedetto et al. ....... 370/256 |
| 6,901,048 | B1 | | 5/2005 | Wang et al. ................... 370/228 |
| 6,901,052 | B2 | * | 5/2005 | Buskirk et al. ............... 370/235 |
| 7,050,392 | B2 | | 5/2006 | Valdevit ....................... 370/228 |
| 7,068,667 | B2 | * | 6/2006 | Foster et al. ................. 370/398 |
| 7,151,778 | B2 | | 12/2006 | Zhu | |
| 7,376,765 | B2 | | 5/2008 | Rangan | |
| 2002/0048272 | A1 | * | 4/2002 | Carvey ......................... 370/400 |
| 2002/0085578 | A1 | * | 7/2002 | Dell et al. .................... 370/422 |
| 2003/0147385 | A1 | * | 8/2003 | Montalvo et al. ............ 370/389 |
| 2004/0024906 | A1 | | 2/2004 | Valdevit et al. .............. 709/241 |
| 2004/0064583 | A1 | | 4/2004 | Dani et al. ................... 709/241 |

(Continued)

OTHER PUBLICATIONS

"*Fibre Channel Methodologies for Interconnects (FC-MI) Rev 1.8*;" NCITS Working Draft Proposed Technical Report; Sep. 28, 2001; pp. Start to 11, 41-60.

(Continued)

*Primary Examiner* — Marsha D Banks Harold
*Assistant Examiner* — Hooman Houshmand
(74) *Attorney, Agent, or Firm* — Wong, Cabello, Lutsch, Rutherford & Brucculeri, L.L.P.

(57) ABSTRACT

A method of routing traffic in a switch includes forming an optimized routing table specifying for each switch ingress port an exit port to be utilized to reach a specified destination domain. The optimized routing table is formed in accordance with load distribution, oversubscription, and fragmentation criteria. The optimized routing table is distributed to a set of ingress ports of the switch. Traffic is processed at the set of ingress ports in accordance with the optimized routing table.

13 Claims, 4 Drawing Sheets

(56) References Cited

U.S. PATENT DOCUMENTS

| | | | |
|---|---|---|---|
| 2005/0105904 A1 | 5/2005 | Varanasi et al. | 398/43 |
| 2005/0201415 A1* | 9/2005 | Narsinh et al. | 370/469 |
| 2005/0281196 A1 | 12/2005 | Tornetta et al. | 370/235 |
| 2006/0023725 A1 | 2/2006 | Makishima | |
| 2008/0316921 A1* | 12/2008 | Mathews et al. | 370/230 |
| 2009/0010279 A1* | 1/2009 | Tsang et al. | 370/468 |
| 2009/0052327 A1* | 2/2009 | Larsson et al. | 370/238 |
| 2009/0067328 A1* | 3/2009 | Morris et al. | 370/230.1 |
| 2009/0116505 A1* | 5/2009 | Bhatia et al. | 370/419 |

OTHER PUBLICATIONS

"*Fibre Channel—Fabric Generic Requirements (FC-FG);*" American National Standards Institute; Dec. 4, 1996; Start to 23.

"*Fibre Channel Physical and Signaling Interface (FC-PH) Rev 4.3;*" American National Standards Institute Working Draft; Jun. 1, 1994; pp. Start to 32.

Burton, Robert C.; "*Fibre Channel;*"*pp. 1-11;* [*online*] *ftp://ftp.netlab.ohio-state.edu/pub/jain/courses/cis788-95/fibre_channel/indes.html,* accessed Feb. 7, 2000.

U.S. Appl. No. 10/609,230, filed Jun. 26, 2007, Pelissier et al.

\* cited by examiner

APPARATUS AND METHOD FOR ROUTING TRAFFIC IN MULTI-LINK SWITCH

CROSS-REFERENCE TO RELATED APPLICATIONS

This application claims the benefit under 35 U.S.C. §119 (e) of U.S. Provisional Patent Application Ser. No. 60/393, 047 entitled "Apparatus and Method for Routing Traffic in a Multi-Link Switch" by Ramkumar Vadivelu filed Jun. 28, 2002 which is hereby incorporated by reference. This application is related to U.S. patent application Ser. No. 10/208, 969 entitled "Load Balancing in a Network Comprising Communication Paths Having Different Bandwidths" by Ezio Valdevit and Vineet Abraham, filed Jul. 31, 2002, which is hereby incorporated by reference.

BRIEF DESCRIPTION OF THE INVENTION

This invention relates generally to routing traffic in computer networks. More particularly, this invention relates to a technique for optimizing the routing of ingress to egress traffic within a multi-link switch that forms a node in a computer network.

BACKGROUND OF THE INVENTION

Computer networks utilize switches to route network traffic. In particular, an ingress port of a switch routes a packet of network traffic to an egress port of the switch based upon the destination address specified by the packet. In some instances there may be several egress ports that can be used to route a packet. Currently, switches route a packet from an ingress port to an egress port without considering a number of factors that could lead to improved switch performance. For example, known switches fail to assess load distribution, over-subscription, and fragmentation issues.

In the case of load distribution, the dynamic alteration of network topologies makes load distribution difficult. Nevertheless, the operation of a switch can be vastly improved if load balance issues are addressed in an efficient manner.

The operation of a switch can also be improved if the traffic to an egress port is not over-subscribed. A port is over-subscribed if the output traffic bandwidth assigned to the port is larger than the bandwidth of the port. The issue of over-subscription must be solved in the context of a switch, in which resources are changing in a dynamic manner, as host and target devices linked to the switch come on and off line.

Fragmentation is another important consideration for a switch. Fragmentation occurs at an egress port when output traffic bandwidth associated with the egress port does not fully occupy the available bandwidth of the egress port. As a result, the egress port is not fully utilized, or additional traffic must be assigned to the port in order to fully utilize the egress port. The issue of fragmentation is difficult to solve in the context of a switch that has dynamically changing ingress and egress bandwidth resources.

Load distribution, over-subscription, and fragmentation issues can be addressed by communicating between switches. Unfortunately, this approach introduces complexity and expense into a network. This approach is also problematic in that it requires the switches within the network to be compatible.

In view of the foregoing, it would be highly desirable to provide an improved switch that facilitates dynamic load distribution, while avoiding over-subscription and fragmentation. Such a switch would ideally operate in an autonomous manner so that its operation was not contingent upon passing information to adjacent switches. Further, such a switch should be compatible with other network switches that do not support the same features.

SUMMARY OF THE INVENTION

The invention includes a method of routing traffic in a switch. A master routing resource table is formed to specify an ingress port, a set of destination domains, a set of exit ports available to access the set of destination domains, and port capacity values corresponding to the set of exit ports. Optimization criteria is applied to the master routing table to form an optimized routing table specifying a selected exit port for each destination domain. The optimized routing table is distributed to the ingress port of the switch. Traffic is processed at the ingress port in accordance with the optimized routing table.

The invention also includes an alternate method of routing traffic in a switch. The method includes forming an optimized routing table specifying for each switch ingress port an exit port to be utilized to reach a specified destination domain. The optimized routing table is formed in accordance with load distribution, oversubscription, and fragmentation criteria. The optimized routing table is distributed to a set of ingress ports of the switch. Traffic is processed at the set of ingress ports in accordance with the optimized routing table.

The invention also includes a computer readable medium to direct a computer to function in a specified manner. An optimized routing table generator produces an optimized routing table specifying for each switch ingress port an exit port to be utilized to reach a specified destination domain. The optimized routing table generator incorporates load distribution, oversubscription, and fragmentation criteria in forming the optimized routing table. A routing table distribution module distributes the optimized routing table to a set of ingress ports of the switch.

The invention provides a switch with dynamic load sharing. The switch avoids over-subscription and fragmentation, even as resources are altered in a dynamic manner. Advantageously, the operation of the switch is not contingent upon passing information to adjacent switches. Moreover, the switch is operable with other network switches that do not support the same dynamic features.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
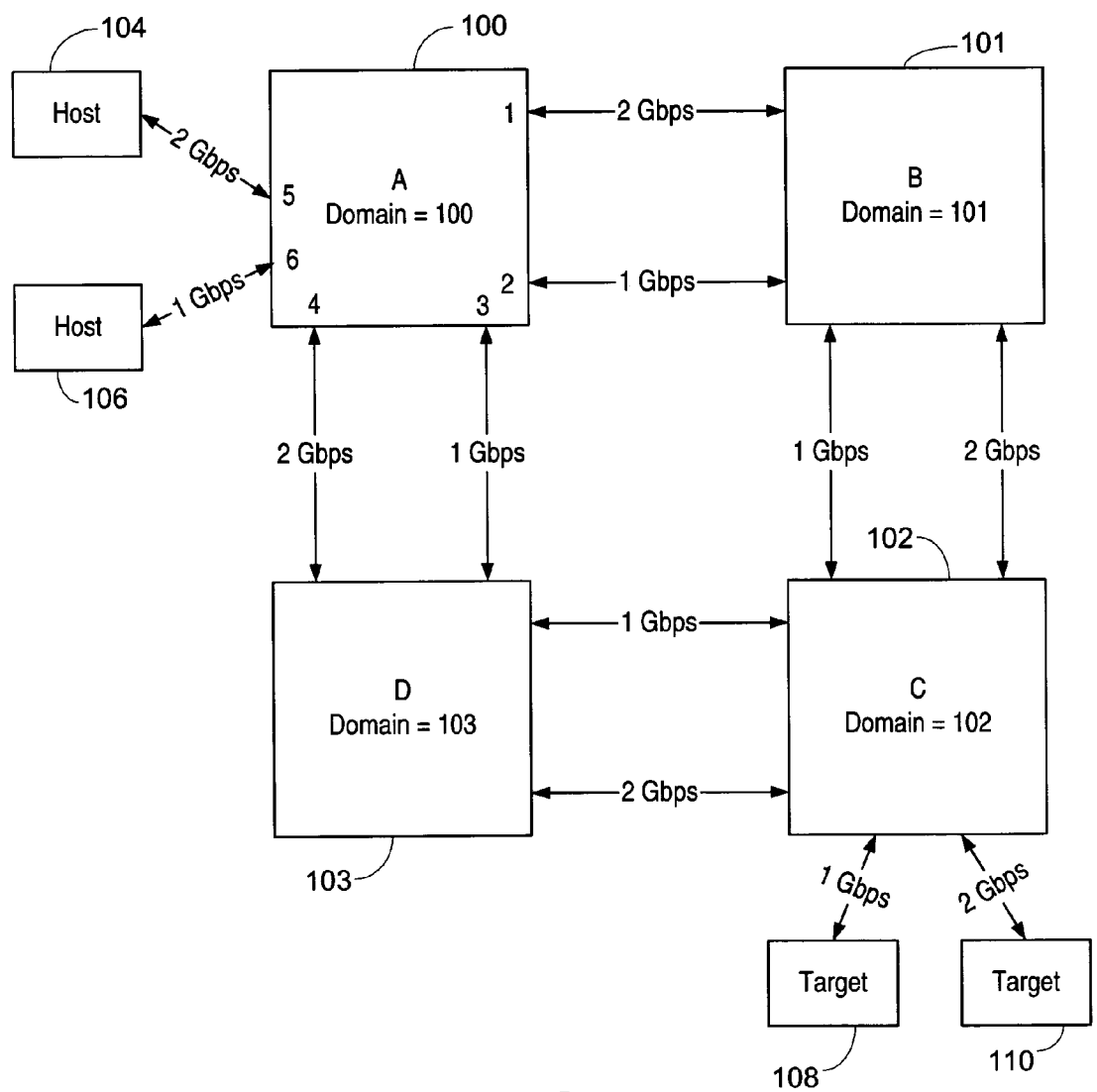
FIG. 1 is an exemplary switch fabric that may be constructed in accordance with an embodiment of the invention.

FIG. 1 illustrates a switch fabric that may be configured in accordance with an embodiment of the invention. By way of example, the switch fabric may form a Fibre Channel Storage Area Network. Routing in a Fibre Channel network is based on forwarding from one switch to another. Typically, each switch represents a point of consolidation of traffic to a particular Fibre Channel Domain. Although the invention is described in connection with a Fibre Channel network, it should be appreciated that the invention is also applicable to other switch fabrics.

The switch fabric includes a first switch 100 with a domain identity of 100. The switch 100 has six ports, including a first port that supports communications at 2 Gbps, a second port that supports communications at 1 Gbps, a third port that supports communications at 1 Gbps, and a fourth port that supports communications at 2 Gbps. Since these links operate at different speeds, load distribution issues arise. The current invention solves these load distribution issues, as discussed below.

As shown in FIG. 1, ports one and two are connected to switch 101, while ports three and four are connected to switch 103. Port five of switch 100 is connected to a host 104 through a 2 Gbps link, while port six of switch 100 is connected to a host 106 through a 1 Gbps link. Switch 102 is connected to a first target 108 and a second target 110, allowing communication between the hosts 104 and 106 and the targets 108 and 110 via the switches 100, 101, 102, and 103.

Figure 2:
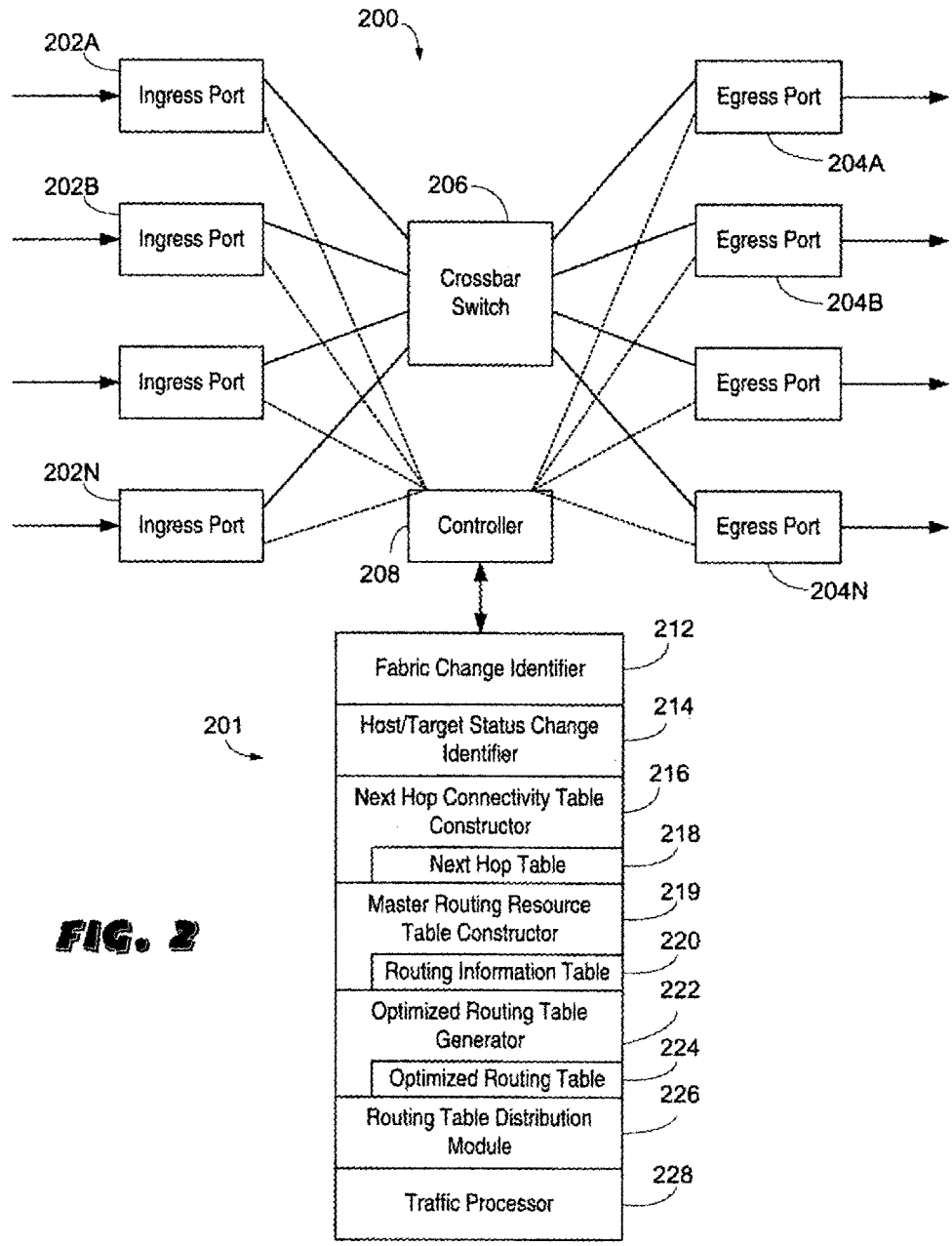
FIG. 2 is an example of a switch constructed in accordance with an embodiment of the invention.

FIG. 2 illustrates a switch topology that may be used to implement any of the switches of FIG. 1. In particular, FIG. 2 illustrates a switch 200 including a set of ingress ports 202A-202N. Traffic received at the ingress ports 202A-202N is routed to a set of exit ports 204A-204N via a crossbar switch 206. A controller 208, such as a central processing unit or an optimized processor, applies control signals to the ingress ports 202A-202N, the switch 206, and the exit ports 204A-204N.

The controller 208 is connected to a memory 210 that stores a set of executable programs. Alternately, the controller 208 can be configured as an Application Specific Integrated Circuit (ASIC) that incorporates the executable programs shown in FIG. 2. The executable programs may also be embodied in a programmable logic device or related device known to those skilled in the art. The executable programs illustrated in FIG. 2 are exemplary in nature, the operations performed by each program may be combined with other programs, or individual programs may be deconstructed into multiple segments.

Memory 210 stores a fabric change identifier 212. This program implements standard communication techniques between switches to identify changes in a fabric. For example, in connection with the Fibre Channel SW-2 standard, when a new fabric is formed, each switch exchanges a Link State Record using a fabric formation protocol defined by the standard.

Memory 210 also stores a host/target status change identifier 214. This executable module identifies when a host or target is connected or disconnected from a switch. Again, standard techniques may be used to implement this operation.

Memory 210 also stores a next hop connectivity table constructor 216, which is used to construct a next hop table 218. The next hop connectivity table constructor 216 performs a shortest path calculation to identify the set of hops required to reach a valid domain ID in a fabric. Standard techniques may also be used in this operation. Below is an example of a next hop table 218 consistent with the example of FIG. 1 from domain 100.

| Destination Domain | Next Hop |
|---|---|
| 101 | 101 |
| 102 | 101, 103 |
| 103 | 103 |

The next hop table illustrates various low cost paths that may be used to move from switch 100 to the other switches in the fabric of FIG. 1. The first row of the table shows that to move from switch 100 to switch 101, the next hop is to switch 101. To travel from the switch 100 to switch 102, a hop to switch 101 or to switch 103 may be performed, as shown in the table. Finally, a path from switch 100 to switch 103 entails a hop directly to switch 103.

Returning to FIG. 2, the memory 210 also stores a master routing resource table constructor 219, which produces a routing information table 220. The routing information table specifies the ports that are available to traverse to a next hop. Typically, there are several ports available. In the prior art, an unrefined approach, such as a round robin selection technique, is used to select an exit port.

The routing information table 220 may also specify additional information, such as the number of ports that may be used, the number of hops to arrive at a destination, and a computed cost to arrive at the destination. Below is an example of a routing information table 220 for the switch 100 of FIG. 1.

| Switch number | Fields | Values |
|---|---|---|
| 101 | Num_paths | 2 |
| | ExitPorts list | 1, 2 |
| | Hops | 1 |
| | Cost | 500 |
| 102 | Num_paths | 4 |
| | ExitPorts list | 1, 2, 3, 4 |
| | Hops | 2 |
| | Cost | 1000 |
| 103 | Num_paths | 2 |
| | ExitPorts list | 3, 4 |
| | Hops | 1 |
| | Cost | 500 |

Referring to switch 101 in the table, it can be seen that to travel from switch 100 to switch 101, there are two paths, namely, exit ports one and two. The table also reflects that there is one hop between these switches. The computed cost of this path is 500 (where 500 indicates the lowest cost, but all possible exit ports in that path are used to ensure use of all exit ports available in that path).

As shown in the table, there are four paths that can be taken to switch 102. The paths include exit ports one, two, three, and four of switch 100. Two hops are required to reach switch 102 from switch 100. The computed cost of this link is 1000. To reach switch 103, two paths may be used, namely, exit ports three and four. This path entails one hop and a computed cost of 500.

The foregoing routing information table 220 can be supplemented with information on the bandwidth capacity of each exit port. The following table is an example of this information for the fabric of FIG. 1. This information may be in a separate table as shown, or may be incorporated into the previously described routing information table 220.

| E-Port number | Value |
| --- | --- |
| 1 | 2 |
| 2 | 1 |
| 3 | 1 |
| 4 | 2 |

The foregoing table illustrates the exit ports for switch 100 and the capacity in Gbps for each exit port. Note that this information is consistent with the information shown in FIG. 1.

The current invention utilizes the information in the routing information table 220 (including exit port capacity) to form an improved routing table. In particular, the invention utilizes an optimized routing table generator 222 to produce an optimized routing table 224. The optimized routing table specifies a single exit port for each destination domain associated with an ingress port. The selection of an exit port is on the basis of optimization criteria, such as load distribution, oversubscription, and fragmentation, as discussed below. This stands in contrast to unrefined prior art approaches, such as round robin selection.

The optimized routing table 224 accounts for the lowest cost among multiple links. It also provides for load balancing. As discussed below, the optimized routing table generator provides load balancing, while avoiding oversubscription and fragmentation at switch exit ports. This optimized routing information is made available in a transparent manner, and does not require switches to exchange information. As demonstrated below, this technique exploits multiple exit ports and provides dynamic load sharing that accounts for different link speeds.

Once the optimized routing table 224 is formed, it is distributed to each ingress port 202A-202N using a routing table distribution module 226. That is, the routing table distribution module 226 includes instructions, executed by the controller 208, which cause the optimized routing table 224 to be routed to the ingress ports 202A-202N. In circumstances where load balancing is not implemented and therefore routing is only optimized on a per port basis, an optimized routing table may be delivered to a single ingress port, as discussed below.

After one or more ingress ports 202 are supplied with the optimized routing table 224 of the invention, the traffic processor 228 is used to control the switch 200 as the switch 200 processes traffic. In particular, the switch 200 processes traffic by making routing decisions at each ingress port 202, with each ingress port utilizing the optimized routing table 224.

Figure 3:
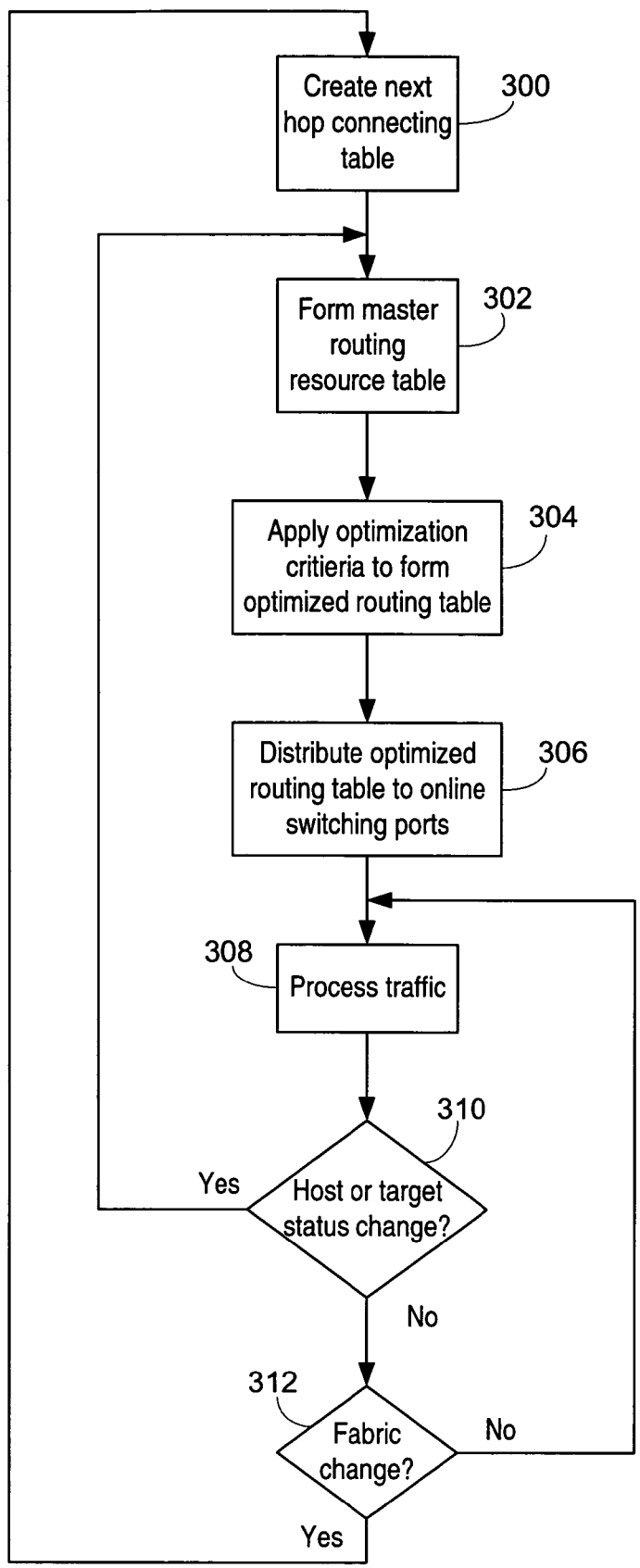
FIG. 3 illustrates processing steps performed in accordance with an embodiment of the invention.

The physical components of the invention have now been described. Attention therefore turns to the processing operations associated with these physical components. FIG. 3 illustrates processing steps performed in accordance with an embodiment of the invention.

As shown in FIG. 3, initially, a next hop connectivity table is created (block 300). The next hop connectivity table constructor 216 may be used to form the next hop table 218, as discussed above. A master routing table is then created (block 302). The master routing resource table constructor 219 may be used to generate a routing information table 220 of the type discussed above.

At this point, the routing information table 220 is processed in accordance with optimization criteria of the invention to form an optimized routing table (block 304). The optimized routing table generator 222 may be used to implement this operation, the details of which are discussed below. Once the optimized routing table 224 is formed, it is distributed to each ingress port (block 306). Thereafter, traffic is processed (block 308) at each ingress port in accordance with the optimized routing table.

On a host/target link status change, processing returns to block 302. Dynamic load distribution criteria is applied by the master routing resource table constructor 219 in the event of a change in host or target status. The master routing resource table constructor 219 applies predetermined criteria to uniformly distribute traffic across the ports of the switch. On a E-port link status change, processing returns to block 300.

Figure 4:
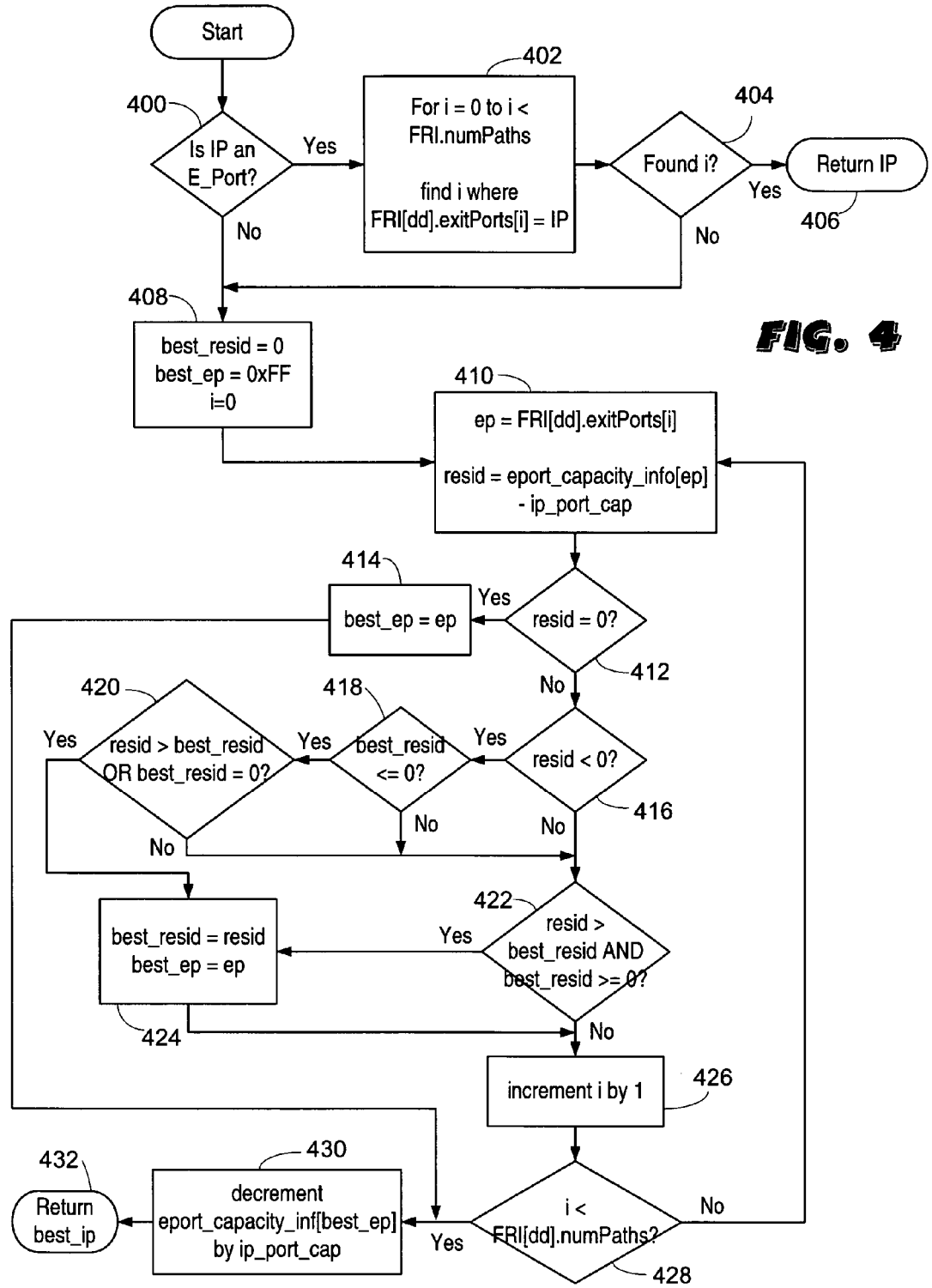
FIG. 4 illustrates an optimized routing table generation operation performed in accordance with an embodiment of the invention.

FIG. 4 illustrates processing steps associated with one embodiment of the optimized routing table generator 222 of the invention. The optimized routing table generator of the invention optimizes traffic routing from ingress ports to exit ports in the context of load considerations. In addition, the optimized routing table generator avoids over-subscribing an exit port with more traffic than can be handled from an ingress port. Also, the optimized routing table generator avoids fragmentation at an exit port, meaning that traffic from an ingress port that cannot fully utilize the capacity of an exit port is preferably not routed to that exit port.

FIG. 4 illustrates a find_best_fit_exit_port function corresponding to an embodiment of the optimized routing table generator 222. Provided an ingress port and the destination domain, this function computes the best exit port that can be used to route frames from the ingress port to the destination domain. The following syntax is used in connection with FIG. 4.

-Function Input
    -Ingress_port (IP)
    -Destination Domain (DD)
-Function Output
    -Exit Port (EP) that can be used to reach the Destination Domain (DD) from the Ingress Port (IP)
-External Variables Accessed
    -Routing table info (referenced as FRI)
    -E-Port Capacity Information (referenced as eport_capacity_info)
-Internal Variables Used
    -ip_port_cap - capacity of the ingress port
    -i - for loop index
    -resid - local variable to store the capacity left in the egress port after accounting for the ingress port capacity
    -best_resid - local variable to store the best resid value during a loop processing
    -best_ep - exit port corresponding to best_resid FIG. 4 will initially be discussed in a general manner. Thereafter, the figure will be discussed in connection with specific values. Blocks 400, 402, and 404 are used to determine whether an ingress port is also an exit port that can be used to route traffic to the next hop. If so, the ingress port is used as the exit port. Block 408 initializes internal variables. Block 410 subtracts the capacity of an ingress port from the capacity of the indexed exit port, to form a residual value "resid". Decision block 412 identifies whether there is a direct capacity match between the ingress port and the exit port. If so, the indexed exit port is assigned as the best exit port at block 414. Thus, blocks 412 and 414 prioritize direct matches in bandwidth between an ingress port and an exit port.

Blocks 416, 418 and 420 test for oversubscription conditions, that is, where an ingress port has a larger capacity than an exit port. This condition is tested at block 416, which identifies when the residual value is negative, indicating an oversubscription condition. Block 418 tests whether the best residual value at this point in the process is zero of negative. If so, as will be the case in the first pass through this loop, processing is passed to block 420, which identifies whether the current residual value is larger than the best residual value or the best residual value is zero, as is the case during the first pass through this loop. Under these conditions, processing is passed to block 424, where the best residual value is assigned the current residual value, and the best exit port is assigned the current exit port. When block 424 is reached through this path, it effectively assigns the least negative residual value as the best residual value. This provides the closest available match in capacity between the ingress port and the exit port. Thus, this processing minimizes oversubscription of an exit port and ensures uniform load distribution even when oversubscription occurs.

If the conditions at blocks 416, 418, or 420 fail, then processing is passed to block 422, which tests for undersubscription or fragmentation of an exit port. Block 422 tests for a best residual greater than or equal to zero and a residual greater than the current best residual. Therefore, this test results in the selection of the largest residual value as the best residual value. The largest residual value represents the largest fragment available, which provides the best opportunity for subsequent matching to an ingress port. Thus, this processing minimizes fragmentation of an exit port.

Block 426 increments the index value "i". Block 428 checks to determine whether all of the paths for this destination domain have been checked. If not, processing returns to block 410. If so, processing proceeds to block 430, which adjusts the capacity of the selected exit port based upon the ingress port traffic that will now be processing. Block 432 returns the best exit port selected through the processing of FIG. 4.

The processing of FIG. 4 is more fully appreciated in connection with specific examples. The following table illustrates ingress ports corresponding to the example of FIG. 1. For each ingress port, the table also lists various destination domains within the switch fabric. The far-right column of the table list an exit port and its associated bandwidth. The column "Exit port returned by fine_best_fit_exit_port( )" lists the exit port that is selected through the processing associated with FIG. 4.

| Ingress Port | Dest. Domain | Exit port returned by best_fit_exit_port( ) | Eport_capacity_info[] values | |
|---|---|---|---|---|
| 1 ip_port_cap = 2 | 101 | 1 | 1 | 2 |
| | | | 2 | 1 |
| | | | 3 | 1 |
| | | | 4 | 2 |
| | 102 | 1 | No Change | |
| | 103 | 4 | 1 | 2 |
| | | | 2 | 1 |
| | | | 3 | 1 |
| | | | 4 | 2 → 0 |
| 2 ip_port_cap = 1 | 101 | 2 | No Change | |
| | 102 | 2 | No Change | |
| | 103 | 3 | 1 | 2 |
| | | | 2 | 1 |
| | | | 3 | −1 |
| | | | 4 | 0 |
| 3 ip_port_cap = 1 | 101 | 1 | 1 | 0 |
| | | | 2 | 1 |
| | | | 3 | −1 |
| | | | 4 | 0 |
| | 102 | 3 | No Change | |
| | 103 | 3 | No Change | |
| 4 ip_port_cap = 2 | 101 | 2 | 1 | 0 |
| | | | 2 | −1 |
| | | | 3 | −1 |
| | | | 4 | 0 |
| | 102 | 4 | No Change | |
| | 103 | 4 | No Change | |
| 5 ip_port_cap = 2 | 101 | 1 | 1 | −2 |
| | | | 2 | −1 |
| | | | 3 | −1 |
| | | | 4 | 0 |
| | 102 | 4 | 1 | −2 |
| | | | 2 | −1 |
| | | | 3 | −1 |
| | | | 4 | −2 |
| | 103 | 3 | 1 | −2 |
| | | | 2 | −1 |
| | | | 3 | −3 |
| | | | 4 | −2 |
| 6 ip_port_cap = 1 | 101 | 2 | 1 | −2 |
| | | | 2 | −2 |
| | | | 3 | −3 |
| | | | 4 | −2 |
| | 102 | 1 | 1 | −3 |
| | | | 2 | −2 |
| | | | 3 | −3 |
| | | | 4 | −2 |
| | 103 | 4 | 1 | −3 |
| | | | 2 | −2 |
| | | | 3 | −3 |
| | | | 4 | −3 |

The ingress port 1 in block 100 has a capacity (ip_port_cap) of 2 (2 Gbps). Further consider that we want to compute a route to domain (switch) 101 from ingress port 1. The first decision block 400 of FIG. 4 is answered yes, since ingress port 1 is also an exit port, as can be appreciated with reference to FIG. 1. At block a decision is made to determine whether the ingress port can be used as an exit port for the specified destination domain. Referring to FIG. 1, it can be appreciated that exit port 1 can be used as an exit port for switch 101, therefore decision block 404 generates a yes and the ingress port is returned as the exit port at block 406. As shown in the table above, for ingress port 1, destination domain 101, the returned "find_best_fit_exit_port" value is 1. With respect to destination domain 102, the same processing produces a returned value of 1, as shown in the table.

With respect to the destination domain 103, the decision block 404 will yield a no this time because the ingress port is an exit port, but it is not a valid exit port for accessing switch 103. Therefore, processing proceeds through the initialization at block 408. The routing information table 220 provided above indicates that for destination domain 103, there are 2 paths through exit ports 3 and 4. The local variables best_resid(0), best_ep(0xFF) and iI(0) are initialized in block 408. In block 410, we consider the first exit port available— ep=3 (FRI[103].exitPorts[0]). The port capacity of 2 Gbps of ingress port 1 is subtracted from the 1 Gbps capacity of port 3 to produce a residual value of −1. Given this value, the decision at block 412 yields a no and processing proceeds to block 416, which produces an answer of yes. At decision block 418 a yes is produced because on the first pass the best_resid value is still set to zero from its initialization. At block 420 a yes is produced for the same reason. Therefore, at block 424, the best_resid value is set to −1 and the best_ep value is set to exit port 3. At block 426 the interval variable I is set to 1. At decision block 428, a no is produced because all of the paths have not been tested, so processing proceeds to block 410. At block 410 ep gets set as 4 (FR[103].exitPorts [1]) the ingress port capacity of 2 Gbps of ingress port 1 is subtracted from the exit port capacity of 2 Gbps associated with port 4, to produce a value of 0. Therefore, at block 412, a yes is produced and the best exit port variable best_ep is assigned the current exit port 4. Thus, the value of 4 is shown in the table above for ingress port 1, destination domain 103. At block 430, the exit port capacity for exit port 4 is decremented by the ingress port capacity, resulting in an exit port capacity of 0, as shown in the table. In particular, the table shows a transition from 2→0 to reflect this change in capacity. Throughout the remainder of the table, only the final exit port value is shown.

Similar processing results in the values associated with ingress port 2. Observe that in the case of destination domains 101 and 102, the processing of blocks 402, 404, and 406 produces an exit port value of 2. In the case of destination domain 103, the processing at block 410 produces a residual value of 0 for exit port 3, therefore the processing at blocks 412 and 414 produces an optimized exit port value of 3.

The routing information table 220 continues to be processed in this manner to form an optimized routing table 224 of the type shown above, where an optimized exit port is specified for each ingress to egress destination. As shown in FIG. 3, this routing table is then distributed to all of on-line switch ports (block 306). Thereafter, traffic is processed (block 308) in accordance with the routing information in the optimized routing table 224.

The next processing step shown in FIG. 3 is to wait for any change in the host or target link status (block 310). If so, then processing returns to block 302, where the information in the master routing resource table is updated. As previously indicated, the updating of the master routing resource table affords the opportunity for load balancing within the switch. In particular, at this time bandwidth may be distributed amongst the ports in accordance with predetermined load balancing criteria.

The next processing operation of FIG. 3, block 304, may be implemented in various manners. In one alternate embodiment, the optimized criteria are not applied to the entire routing information table. Instead, the criteria are only applied to a selected ingress port that has come on line. Then, at block 306, the optimized routing information is only routed to the impacted on-line port. The advantage of this embodiment is that it is faster, as the best fit criteria is only applied to a single port and the resultant routing information is only delivered to a single port. The disadvantage of this embodiment is that only one port is processed, and therefore load balancing optimizations between ports cannot be accomplished.

Expanding on this example of processing ingress port information for a subet of ingress port, assume two hosts are introduced into the system of FIG. 1. The two new hosts are connected to switch 100 through a 1 Gbps link at port 7 (not shown) and a 2 Gbps link at port 8 (not shown). Relying upon the example of the previous routing information table and the processing of FIG. 4, routes calculated for these new ports would be as shown in the following table.

| Ingress Port | Dest. Domain | Exit port returned by find_best_fit_exit_port( ) | Eport_capacity_info[ ] values | |
|---|---|---|---|---|
| 7 ip_port_cap = 1 | 101 | 2 | 1 | −3 |
| | | | 2 | −3 |
| | | | 3 | −3 |
| | | | 4 | −3 |
| | 102 | 1 | 1 | −4 |
| | | | 2 | −3 |
| | | | 3 | −3 |
| | | | 4 | −3 |
| | 103 | 3 | 1 | −4 |
| | | | 2 | −3 |
| | | | 3 | −4 |
| | | | 4 | −3 |
| 8 ip_port_cap = 2 | 101 | 2 | 1 | −4 |
| | | | 2 | −5 |
| | | | 3 | −4 |
| | | | 4 | −3 |
| | 102 | 4 | 1 | −4 |
| | | | 2 | −5 |

-continued

| Ingress Port | Dest. Domain | Exit port returned by find_best_fit_exit_port( ) | Eport_capacity_info[ ] values | |
|---|---|---|---|---|
| | | | 3 | −4 |
| | | | 4 | −5 |
| | 103 | 3 | 1 | −4 |
| | | | 2 | −5 |
| | | | 3 | −6 |
| | | | 4 | −5 |

Those skilled in the art will recognize a number of advantages associated with the invention. First, the invention provides a switch with dynamic load sharing between its various ports. The switch avoids over-subscription and fragmentation. Advantageously, the operation of the switch is not contingent upon passing information to adjacent switches. Moreover, the switch is operable with other network switches that do not support the same dynamic features.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method of routing traffic in a switch, comprising:
    forming a master routing resource table specifying a set of destination domains, a set of exit ports available to access said set of destination domains, and port capacity values corresponding to said set of exit ports;
    applying optimization criteria to said master routing table to form an optimized routing table specifying a selected exit port of said set of exit ports for each destination domain including matching an ingress port to an exit port of said set of exit ports with a common bandwidth;
    distributing said optimized routing table to said ingress port of said switch; and
    processing traffic at said ingress port in accordance with said optimized routing table.

2. The method of claim 1 further comprising:
    identifying an alteration in the status of a host or target connected to said switch; and
    forming a revised master routing resource table in response to said identifying, wherein said revised master routing resource table is formed to establish an exit port load balance in accordance with predetermined criteria.

3. The method of claim 2 wherein said switch includes a plurality of ingress ports and wherein distributing includes distributing said optimized routing table to said plurality of ingress ports of said switch.

4. The method of claim 1 further comprising:
    recognizing a change in the network fabric topology in response to a switch coming on line or going off line; and
    forming a next hop table in response to said recognizing.

5. The method of claim 1 wherein applying further includes applying optimization criteria to match an ingress port to a corresponding exit port that services a hop to a specified destination domain.

6. The method of claim 1 wherein applying further includes applying optimization criteria to minimize oversubscription of an exit port.

7. The method of claim 1 wherein applying further includes applying optimization criteria to minimize fragmentation of an exit port.

8. A method of routing traffic in a switch, comprising:
    forming a master routing resource table specifying a set of destination domains, a set of exit ports available to access said set of destination domains, and port capacity values corresponding to said set of exit ports;
    forming an optimized routing table specifying for each switch ingress port an exit port to be utilized to reach a specified destination domain from said master routing resource table, wherein said optimized routing table is formed in accordance with optimization criteria including load distribution, oversubscription, and fragmentation, and including matching an ingress port to an exit port with a common bandwidth;
    distributing said optimized routing table to a set of ingress ports of said switch; and
    processing traffic at said set of ingress ports in accordance with said optimized routing table.

9. The method of claim 8 further comprising:
    identifying an alteration in the status of a host or target connected to said switch; and
    forming a revised optimized routing table in response to said identifying.

10. The method of claim 8 further comprising:
    recognizing a change in the network fabric topology in response to a switch coming on line or going off line; and
    forming a next hop table in response to said recognizing.

11. The method of claim 8 wherein forming includes applying optimization criteria to match an ingress port to a corresponding exit port that services a hop to the specified destination domain.

12. The method of claim 8 wherein forming includes applying optimization criteria to minimize oversubscription of an exit port.

13. The method of claim 8 wherein forming includes applying optimization criteria to minimize fragmentation of an exit port.

* * * * *